United States Patent
Brault et al.

(10) Patent No.: US 7,568,336 B2
(45) Date of Patent: Aug. 4, 2009

(54) AEROENGINE FITTED WITH HEAT EXCHANGER MEANS

(75) Inventors: Michel Gilbert Roland Brault, Quincy Sous Senart (FR); Stephane Rousselin, Hericy (FR); Nicolas Jerome Jean Tantot, Paris (FR); Roxane Carmelle Jeanne Yvonne Touret, Paris (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/037,499

(22) Filed: Feb. 26, 2008

(65) Prior Publication Data

US 2008/0202094 A1    Aug. 28, 2008

(30) Foreign Application Priority Data

Feb. 27, 2007    (FR) .................................. 07 53516

(51) Int. Cl.
*F02K 3/02*    (2006.01)
(52) U.S. Cl. ........................................ 60/226.1; 60/728
(58) Field of Classification Search .................. 60/728, 60/226.1, 266
See application file for complete search history.

(56) References Cited

U.S. PATENT DOCUMENTS

| 6,134,880 A | 10/2000 | Yoshinaka |
| 7,377,100 B2 * | 5/2008 | Bruno et al. .................. 60/267 |

FOREIGN PATENT DOCUMENTS

| EP | 0 911 505 A2 | 4/1999 |
| EP | 0 924 409 A2 | 6/1999 |
| FR | 2 400 618 | 3/1979 |
| FR | 2 482 196 | 11/1981 |

* cited by examiner

*Primary Examiner*—Michael Cuff
*Assistant Examiner*—Vikansha S Dwivedi
(74) *Attorney, Agent, or Firm*—Oblon, Spivak, McClelland, Maier & Neustadt, P.C.

(57) ABSTRACT

An aeroengine includes a primary air circuit; a high-pressure compressor fed by the primary air; and a secondary air circuit. The engine further includes at least one heat exchanger mounted in the primary air circuit upstream from the high-pressure compressor, the heat exchanger including a cold secondary circuit and a hot primary circuit, the hot primary circuit being fed with air from the primary air circuit and the cold secondary circuit being fed with air from the secondary air circuit. The cold circuit of the heat exchanger is fed by pipes that open out into the secondary air circuit.

7 Claims, 2 Drawing Sheets

AEROENGINE FITTED WITH HEAT EXCHANGER MEANS

The present invention relates to an aeroengine fitted with heat exchanger means.

BACKGROUND OF THE INVENTION

In particular in the context of an aeroengine of standard type, it is known that lowering the temperature of the primary air flowing through the compression stages of the engine makes it possible, for given compressor technology, either to reduce the fuel consumption of the engine, or else to reduce its emission of pollution such as nitrogen oxides (NOx). If it is desired to maintain the initial temperature, it is then possible to increase the overall pressure ratio (OPR), thus making it possible to reduce fuel consumption, otherwise if it is desired to maintain the OPR, then the temperature reduction reserves to reduce the emission of NOx pollution.

Attempts have already been made to reduce the temperature of the primary air by using a heat exchanger. For example, this is described in EP 1 555 406 or U.S. Pat. No. 4,254,618. In those two examples, a fraction of the primary air is taken upstream from the high-pressure compressor and caused to pass through a heat exchanger mounted in the secondary air stream, and the air that has been cooled is returned to the inlet of the high-pressure compressor. However, that disposition does not make it possible to obtain a genuinely satisfactory reduction in temperature.

Document FR 2 482 196 describes heat exchanger means in accordance with the precharacterizing portion of claim 1.

OBJECTS AND SUMMARY OF THE INVENTION

An object of the present invention is to provide an aeroengine fitted with a heat exchanger that makes it possible achieve a useful reduction in the temperature of the primary air by means of a heat exchanger. To achieve this object, the aeroengine of the invention comprises:

a primary air circuit;
a high-pressure compressor fed by said primary air;
a secondary air circuit; and
at least one heat exchanger mounted in the primary air circuit upstream from the high-pressure compressor, said heat exchanger comprising a cold secondary circuit and a hot primary circuit, said hot primary circuit being fed with air from said primary air circuit, and said cold secondary circuit being fed with air from the secondary air circuit, the inlet of the cold secondary circuit of the heat exchanger being connected to air intake means disposed in the secondary air circuit, symmetrically about the axis of said engine, and the outlet from the cold circuit of the heat exchanger being connected to means for reinjecting air into said secondary air circuit and disposed symmetrically about the axis of said engine;

wherein the air intake means and the air reinjection means are constituted by open first ends of pipes having second ends connected to said heat exchanger, said open first ends being distributed angularly in regular manner relative to the axis of the engine.

It will be understood that since the heat exchanger is disposed in the primary air circuit upstream from the high-pressure compressor, all of the primary air stream passes through the heat exchanger prior to penetrating into the high-pressure compressor. This makes it possible to achieve a significant reduction in the temperature of the primary air at the inlet to the HP compressor. In addition, since the air intake for feeding the cold circuit of the heat exchanger is constituted by pipes of a diameter that is necessarily small, the flow is accelerated.

Preferably, said heat exchanger is annular and presents the same axis of revolution as the engine. It will thus be understood that the heat exchanger can easily be mounted in the engine without significantly modifying its structure.

Preferably, the open first ends of the pipes of said air intake means are configured to take about 10% of the total secondary air stream.

BRIEF DESCRIPTION OF THE DRAWINGS

Other characteristics and advantages of the invention appear better on reading the following description of embodiments of the invention given as non-limiting examples. The description refers to the accompanying figures, in which.

MORE DETAILED DESCRIPTION

Figure 1:
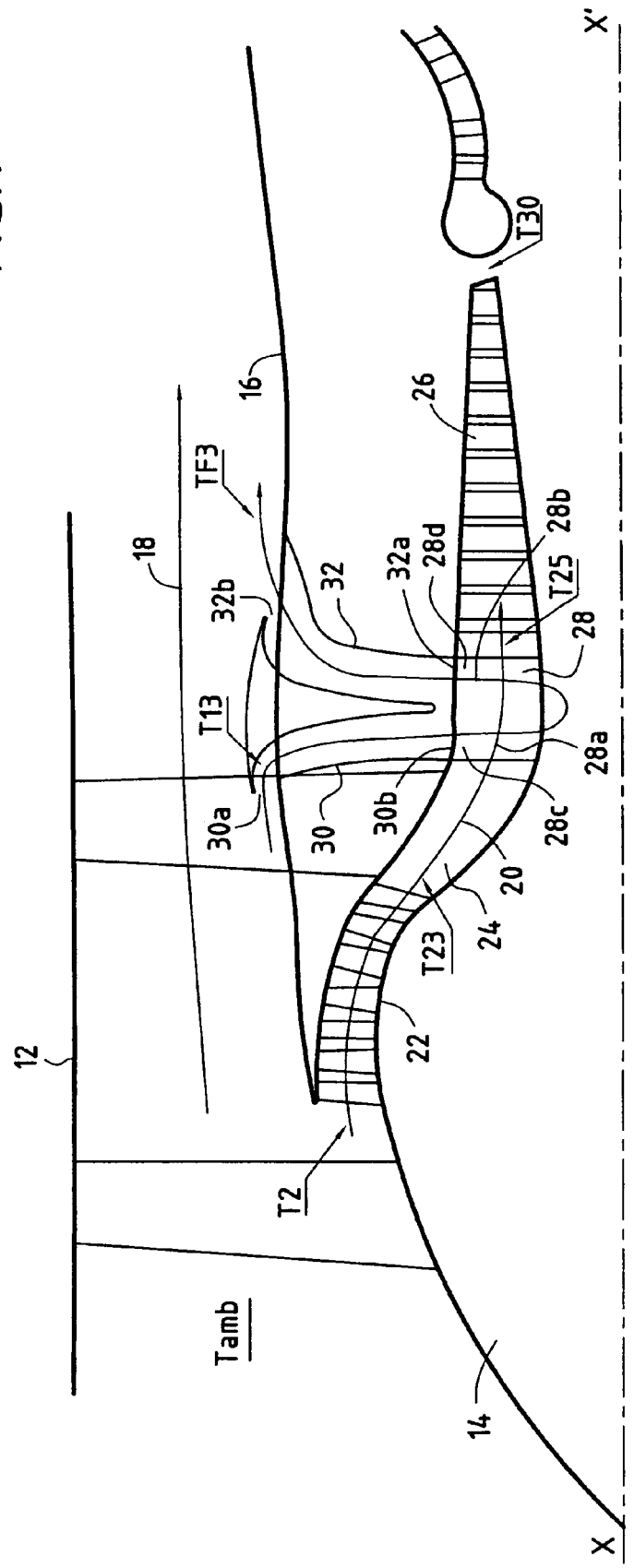
FIG. 1 is a simplified half-view in longitudinal section showing a portion of an aeroengine fitted with a heat exchanger of the invention.

With reference initially to FIG. 1, there follows a description of the principle of the invention. In this figure, there can be seen the front portion of an aeroengine which constitutes a body of revolution about a longitudinal axis XX'. The figure also shows an air sleeve 12 and a front casing 14 together with a nacelle casing 16. Between them, these casings and the air sleeve 12 define both a secondary air circuit 18 and a primary air circuit 20.

In known manner, the primary air circuit 20 follows a path comprising a low-pressure compressor 22, an intermediate casing 24, and a high-pressure compressor 26. According to an essential characteristic of the invention, a heat exchanger 28, preferably of annular shape, is interposed in this primary air circuit between the intermediate casing 24 and the inlet to the high-pressure compressor 26. The heat exchanger 28 naturally comprises a hot primary circuit 28a and a cold secondary circuit 28b. The hot primary circuit 28a of the heat exchanger has all of the primary air stream passing therethrough. The cold secondary circuit 28b of the heat exchanger 28 is fed with air taken from the secondary air circuit 18. In this purely theoretical figure, there are shown air-taking pipes 30, each having one end 30a opening out into the secondary air circuit 18 and an opposite end 30b connected to the inlet 28c of the cold secondary circuit 28b of the heat exchanger 28. Similarly, the air stream taken from the secondary air circuit is reinjected back into said circuit via pipes such as 32, each having one end 32a connected to the outlet 28d of the secondary circuit of the heat exchanger 28 and an opposite end 32b opening out into the secondary air circuit 18. As explained below, when describing preferred embodiments of the invention, the secondary air intake ends 30a and the secondary air return ends 32b are defined in such a manner as to disturb the flow of the secondary air stream 18 as little as possible.

In this theoretical diagram, there can be seen the various temperatures that are obtained at different points of the primary and second air circuits by using the invention. At the inlet to the secondary air circuit, temperature is ambient temperature, e.g. 303 kelvins (K); the temperature T2 at the inlet to the low-pressure compressor 22 is equal to 307 K, for example, the temperature T23 at the outlet from the low-pressure compressor 22 is equal to 403 K; the temperature T13 of the inlet 30a of the means for taking secondary air is equal to 340 K; and the temperature TF3 at the outlet from the means for reinjecting air into the secondary stream is equal to 373 K. It should be emphasized that the temperature T25 at the outlet from the primary circuit of the heat exchanger 28, i.e. the temperature of the primary air stream at the inlet to the HP compressor is reduced to 373 K. This represents a highly significant drop of 30 K relative to a situation in which no heat exchanger 28 included. Also shown is the temperature T30 at the outlet from the high-pressure compressor 26 which is equal to 901 K.

As explained above, two different kinds of use can be made of the drop in the temperature of the primary air that is obtained by implementing the heat exchanger in accordance with the invention. In the example shown in FIG. 1, this drop in temperature is used for reducing the temperature at the outlet from the high-pressure compressor, thereby reducing the rate at which nitrogen oxides are discharged.

As explained above, the drop in the temperature of the primary air due to the presence of the heat exchanger 28 can also be used for increasing the overall compression ratio of the engine as a whole, and in particular the compression ration of the high-pressure compressor 26, so as to reduce the fuel consumption of the engine shown in FIG. 1, while keeping the temperature at the outlet from the compressor constant.

Figure 2:
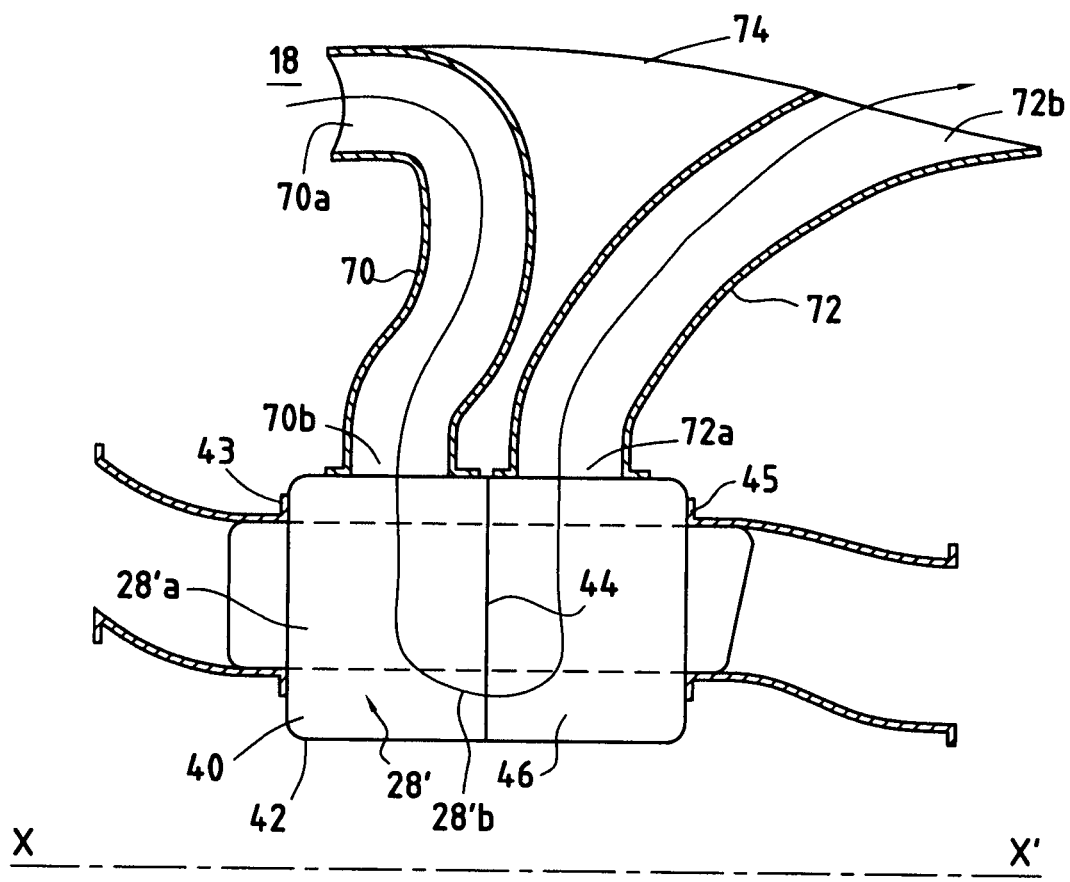
FIG. 2 is a view similar to that of FIG. 1, showing an embodiment detail of the invention.

With reference to FIG. 2, there follows a detailed description of an embodiment of the invention.

In this embodiment, the heat exchanger is given numerical reference 28'. The heat exchanger 28' is generally annular in shape and is constituted for its hot primary circuit 28'a by tubes 40 that are disposed in annular manner within a casing 42 of the heat exchanger 281. The primary air stream thus flows through the tubes 40 that are parallel to the axis XX' and all of the primary air thus flows through the heat exchanger. The heat exchanger also has a secondary circuit 28'b that is defined inside the casing 42 by a radial baffle 44 and by a distribution manifold 46. The secondary air fed to the secondary circuit of the heat exchanger is taken from the secondary air circuit 18.

The casing 42 of the heat exchanger 28' is preferably fastened by flanges 43 and 45 to the outlet of the intermediate casing 24 and to the inlet of the HP compressor 26.

Air is taken from the secondary air stream 18 with the help of "scoops" that constitute the ends of pipes connected to the inlet of the heat exchanger. These pipes and these scoops are distributed angularly in regular manner in the secondary air circuit around the axis XX' of the engine.

FIG. 2 thus shows a pipe 70 for feeding secondary air to the heat exchanger, the pipe being substantially orthogonal to the axis XX' of the engine and having one end 70a that constitutes a "scoop". The other end of the pipe 70, referenced 70b, is connected to the inlet of the secondary circuit of the heat exchanger 28'. Similarly, each feed pipe 70 is associated with a return pipe 72 having one end 72b opening out into the secondary air circuit and an opposite end 72a connected to the outlet of the cold secondary circuit of the heat exchanger 28'. The intake pipes 70 are dimensioned in such a manner that the sectional area of an intake end 70a multiplied by the number of pipes 70 represents about 10% of the sectional area of the secondary air circuit. In addition, and preferably, a substantially cylindrical metal sheet 74 is secured firstly to the ends 70a of the intake pipe 70 and secondly to the ends of one edge of the return pipe 72 so as to ensure that the flow of secondary air in the secondary air circuit is regular.

It should be observed that since the intake pipes 70 with their scoops 70a take only about 10% of the total secondary air stream, this situation means that the flow of air traveling in the intake pipe 70 and the return pipe 72 is accelerated.

What is claimed is:

1. An aeroengine comprising:
   a primary air circuit inside a casing;
   a high-pressure compressor fed by air from the primary air circuit;
   a secondary air circuit define by said casing and a radially outward sleeve; and
   at least one heat exchanger mounted in the primary air circuit upstream from the high-pressure compressor, said heat exchanger comprising a cold secondary circuit and a hot primary circuit, said hot primary circuit being fed with the air from said primary air circuit, and said cold secondary circuit being fed with air from the secondary air circuit, an inlet of the cold secondary circuit of the heat exchanger being connected to air intake means disposed in the secondary air circuit, symmetrically about the axis of said engine the air intake means being configured to take only a fraction of the secondary air stream and an outlet from the cold circuit of the heat exchanger being connected to means for reinjecting air into said secondary air circuit and disposed symmetrically about the axis of said engine;
   wherein the air intake means and the air reinjection means are constituted by open first ends of pipes having second ends connected to said heat exchanger, said open first ends being distributed angularly in regular manner relative to the axis of the engine.

2. An aeroengine according to claim 1, wherein said heat exchanger is annular and presents the same axis of revolution as the engine.

3. An engine according to claim 1, wherein said heat exchanger is mounted between said high-pressure compressor and an intermediate casing disposed in said primary air circuit upstream from the high-pressure compressor.

4. An engine according to claim 1, wherein the open first ends of the pipes of said air intake means are configured to take about 10% of the total secondary air stream.

5. An engine according to claim 1, wherein all of the air from said primary air circuit flows through the heat exchanger.

6. An engine according to claim 1, wherein said heat exchanger includes a heat exchanger casing mounted inside said primary air circuit, wherein said heat exchanger casing includes said cold secondary circuit and said hot primary circuit such that heat is exchanged inside said heat exchanger casing between the air from said primary air circuit and the air from said secondary air circuit.

7. An engine according to claim 1, wherein heat exchanger is positioned outside the secondary air circuit.

* * * * *